US00RE37713E

(19) United States
(12) Reissued Patent
Pearson et al.

(10) Patent Number: US RE37,713 E
(45) Date of Reissued Patent: May 28, 2002

(54) TEST RESULT READER

(75) Inventors: Michael Thomas Pearson; Kishen Gohil, both of Surrey (GB)

(73) Assignee: Unipath Limited, Basingstoke (GB)

(21) Appl. No.: 29/107,620

(22) Filed: Sep. 3, 1999

Related U.S. Patent Documents

Reissue of:
(64) Patent No.: Des. 380,837
Issued: Jul. 8, 1997
Appl. No.: 29/036,578
Filed: Mar. 22, 1995

(30) Foreign Application Priority Data

Sep. 23, 1994 (GB) ..... 2042112

(51) LOC (6) Cl. ..... 24-01
(52) U.S. Cl. ..... D24/223
(58) Field of Search ..... D24/223, 224, D24/225, 186, 185, 232; D10/81; 422/61, 62, 50, 68.1; 435/810, 806

(56) References Cited

U.S. PATENT DOCUMENTS

D319,103 S * 8/1991 Chiu ..... D24/223
D328,135 S * 7/1992 Fan et al. ..... D24/223
D338,275 S * 8/1993 Fischer et al. ..... D24/232
D359,125 S * 6/1995 Livingston ..... D24/223

* cited by examiner

*Primary Examiner*—Stella Reid
(74) *Attorney, Agent, or Firm*—Pillsbury Winthrop LLP

(57) CLAIM

The ornamental design for a [pregnancy] test result reader, as shown and described.

DESCRIPTION

FIG. 1 is a front perspective view from above and one side, showing the [pregnancy] test result reader with lid opened;
FIG. 2 is a view of the other side;
FIG. 3 is a rear view; and,
FIG. 4 is a bottom plan view.

1 Claim, 2 Drawing Sheets

Figure 1:
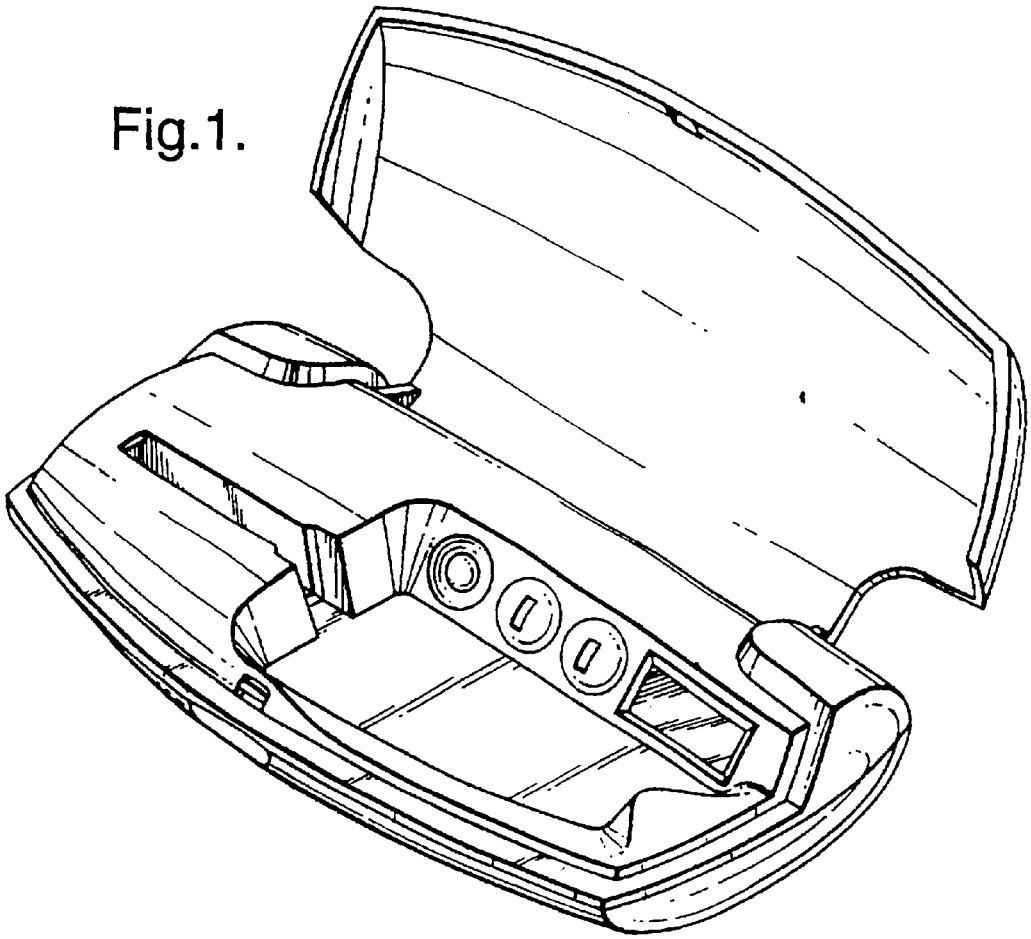
Figure 2:
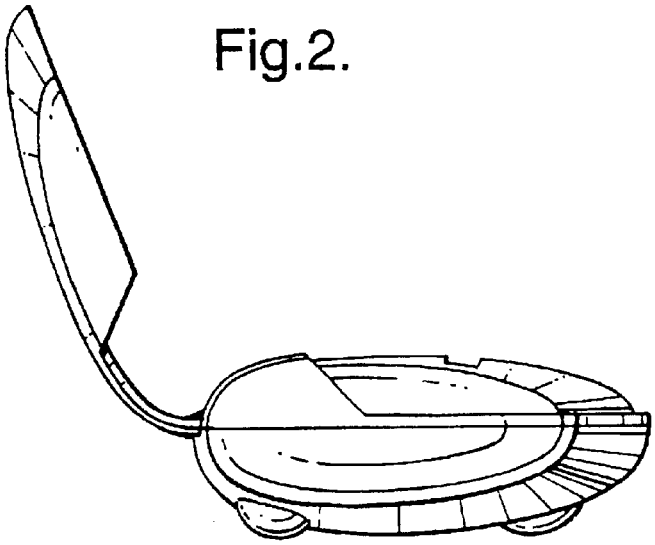
Figure 3:
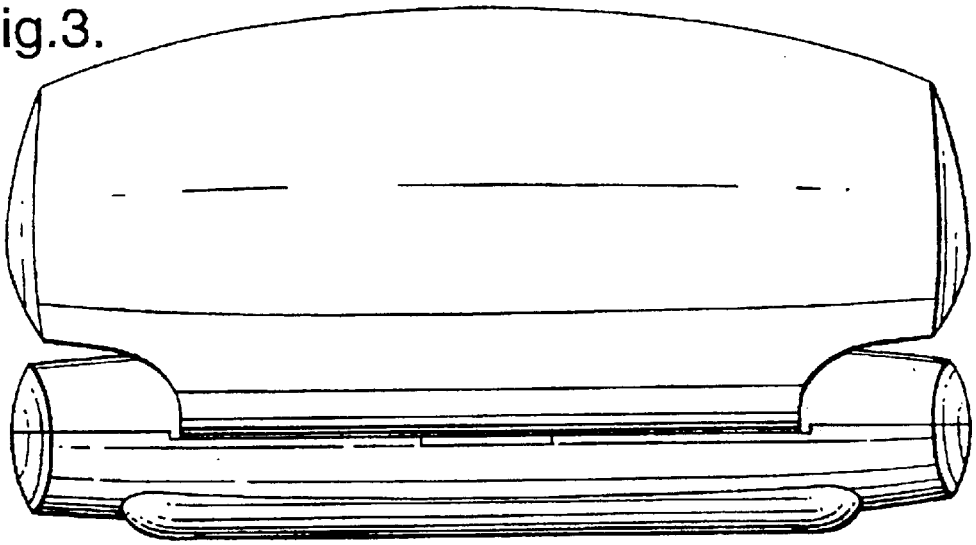
Figure 4:
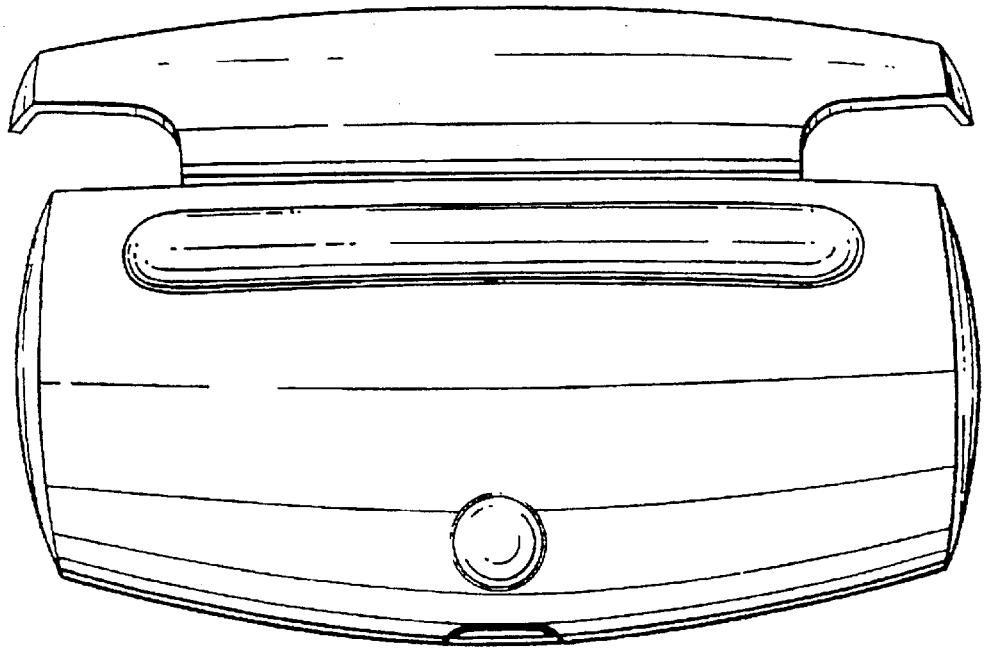

Matter enclosed in heavy brackets [ ] appears in the original patent, but forms no part of this reissue; matter printed in italics indicates the additions made by reissue.